United States Patent Office 2,982,774
Patented May 2, 1961

2,982,774

21-ALDEHYDES OF 9α-FLUORO-STEROIDS AND DERIVATIVES THEREOF

Max Tishler, Westfield, N.J., assignor to Merck & Co., Inc., Rahway, N.J., a corporation of New Jersey No Drawing. Filed Aug. 6, 1954, Ser. No. 448,388

16 Claims. (Cl. 260—397.45)

This invention relates to 9α-fluoro-steroids and particularly to 9α-fluoro-steroids having a glyoxyl side-chain at the 17 position, derivatives thereof, and methods of preparing these compounds.

The adrenal cortical hormones, 4-pregnene-17α,21-diol-3,11,20-trione (cortisone) and 4-pregnene-11β,17α,21-triol-3,20-dione (hydrocortisone), have been found to be very valuable in the treatment of various diseases. This invention is concerned with the preparation of novel compounds having cortisone-like activity, but possessing different physical and chemical characteristics than cortisone and hydrocortisone.

The new compounds which are the subject of the present invention are compounds having the following structural formula:

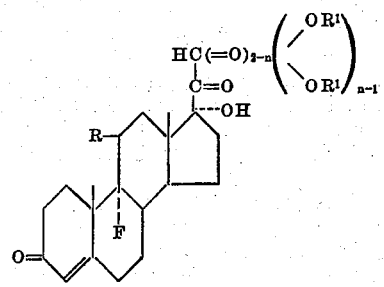

wherein R represents a keto group or a hydroxy group, $R^1$ is hydrogen or an alkyl or acyl group, and $n$ is either 1 or 2; and alkali metal and alkaline earth metal bisulfite addition products of the aldehydes.

The compounds of the invention are prepared by oxidizing 9α-fluoro-cortisone or 9α-fluoro-hydrocortisone to form the corresponding 21-aldehyde, the aldehyde is isolated in the form of the glyoxyl derivative or hydrate, which are readily formed in aqueous solution. The aldehydes can be reacted with an alkali metal bisulfite or an alkaline earth metal bisulfite to form their bisulfite addition products, and the aldehydes, hydrates, or glyoxyl derivatives are readily acylated to convert them to the diester. These reactions may be chemically represented as follows:

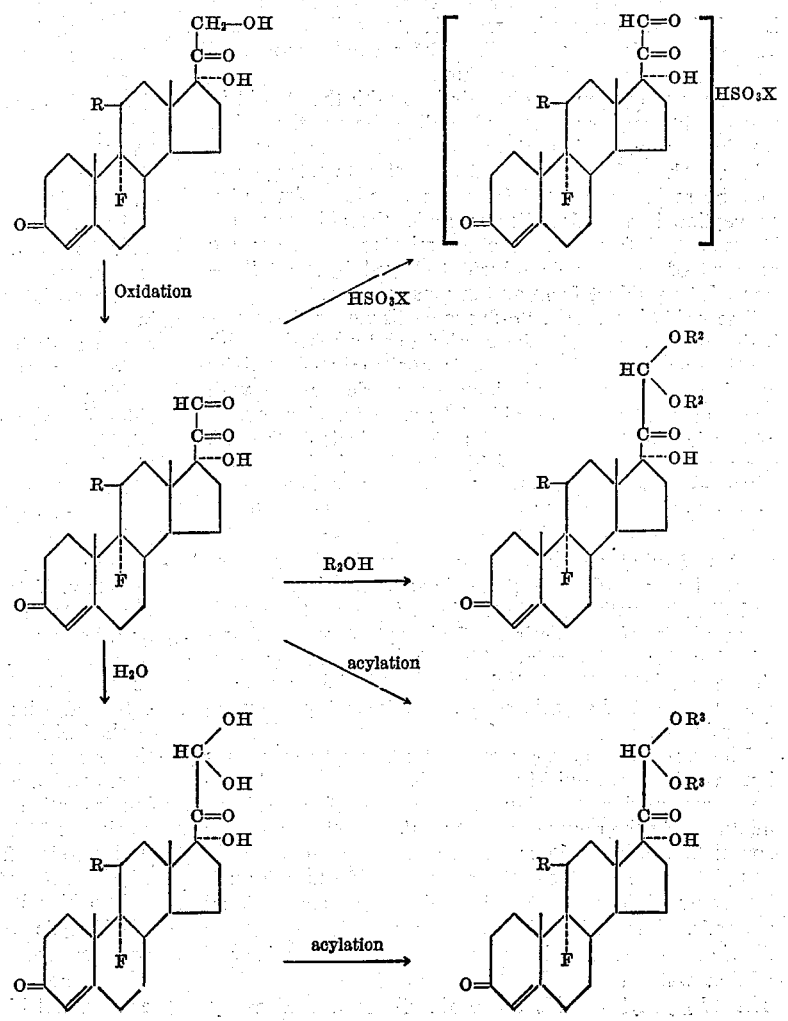

wherein R is as indicated above; $R^2$ is an alkyl group, $R^3$ is an acyl group and X is an alkali metal or alkaline earth metal.

The oxidation of the 9α-fluoro-cortisone or 9α-fluoro-hydrocortisone is carried out directly by air in the presence of a metal salt. The catalytic oxidation is preferably carried out with a copper acetate catalyst, but other metallic catalysts may be used, such as alcohol-soluble metal salts, as for example, copper and iron salts of which ferric chloride is an example, and the like. The amount of catalyst used may vary, but the preferred range is from 0.1 to 3 percent by weight, based on the weight of the steroid.

Although it is preferred to use air as the source of the oxygen, relatively pure gaseous oxygen may also be used. The air or oxygen may be supplied at atmospheric pressure, or at subatmospheric or superatmospheric pressure. The rate of reaction will, however, vary according to the quantity of oxygen and the condition under which it is supplied.

The reaction is preferably carried out in a solvent for the steroid, such as methyl alcohol, ethyl alcohol, acetone or methyl ethyl ketone. An aqueous solution of methanol has been found to be particularly useful as the solvent. The reaction may also be carried out in a non-solvent by suspending or dispersing the steroid throughout the reaction medium. The reaction temperature is not critical and may be varied up to the boiling point of the solvent. The rate of oxidation increases at elevated temperatures. It is ordinarily desired for convenience to effect the oxidation at about 45 to 60° C. at atmospheric pressure. When the reaction is carried out in this temperature range, it requires from five to fifteen hours to complete. In order to promote the reaction, it is desirable to conduct it under slightly acidic conditions as, for example, by the addition of a small amount of acetic acid to the reaction medium.

The air or oxygen may be admixed with the steroid in any suitable manner, such as bubbling the gas through a solution or suspension of the steroid in a closed container. The aldehydes formed according to this process may be readily separated from the reaction mixture by conventional methods. For example, the aldehyde may be recovered from the reaction mixture by azeotropic removal of the organic solvent followed by crystallization of the product from an aqueous solution.

The oxidation of the 9α-fluoro-cortisone or 9α-fluoro-hydrocortisone can also be carried out by reacting with cupric acetate. This reaction is preferably effected by reacting about two equivalents of cupric acetate with one equivalent of the steroid. The use of a slight excess of cupric acetate, such as 2.1 to 2.2 equivalents thereof, serves to produce the best yields of the aldehydes.

The reaction is most conveniently achieved by intimately contacting the steroid and cupric acetate in a suitable solvent such as water or a polar organic solvent. Examples of suitable polar organic solvents for this purpose are the lower alcohols, acetone, dioxane, tetrahydrofuran, and dimethoxyethane. Generally, it is found that maximum yields of the desired 17-glyoxyl steroid are obtained under optimum conditions by effecting the reaction at an acid pH. This is accomplished by adding a minor amount of an acid such as acetic acid to the reaction mixture.

The reaction proceeds slowly at normal temperatures but may be more quickly accomplished at elevated temperatures, preferably reflux temperatures of the solvent mixture. At the reflux temperature the reaction is usually complete within an hour. After the reaction has been completed, the 17-glyoxyl-9α-fluoro-steroid may be readily separated from the reaction mixture by conventional methods. One such typical separation method comprises filtering the reaction mixture to remove cuprous oxide and adding water to the filtrate to precipitate the product. The 17-glyoxyl steroids are ordinarily recovered as hydrates from aqueous solutions but yield the free aldehydes after drying under suitable conditions.

The acetal derivative (21,21-dialkoxy-derivative) of the 21-aldehydes of 9α-fluoro-cortisone and 9α-fluoro-hydrocortisone are prepared by reacting the aldehyde or hydrate with an alcohol in the presence of a trace of mineral acid, such as sulfuric acid or hydrochloric acid. The alcohol has the formula $R^2OH$ wherein $R^2$ is an alkyl group and preferably having from one to eight carbon atoms. Typical examples of suitable alcohols are methanol, ethanol, 1-propanol, 1-butanol, 2-methyl-1-propanol, 2-butanol, 1-pentanol, 1-hexanol, benzyl alcohol and phenylethyl alcohol. The reaction proceeds rapidly, at room temperature, and the product may be recovered by the addition of a miscible solvent in which the acetal is insoluble. Examples of compounds which may be prepared in this manner are as follows: derivatives of 9α-fluoro-cortisone and 9α-fluoro-hydrocortisone; 21,21-dimethoxy derivatives; 21,21-diethoxy derivatives; 21,21-dipropionoxy derivatives; 21,21-dibutoxy derivatives; 21,21-di(2-methylpropionoxy) derivatives; 21,21-dipentoxy derivatives; and 21,21-dibenzyloxy.

The diester derivatives (21,21-diacyloxy derivatives) of the 21-aldehydes of 9α-fluoro-cortisone and 9α-fluoro-hydrocortisone are prepared by reacting the aldehydes, and hydrates thereof with an acylating agent. Suitable acylating agents are acid halides, such as the acid chlorides, acid anhydrides, and others, with the acid anhydrides being preferred, the acylating agent containing the acyl residue of an organic carboxylic acid, especially those containing from one to eight carbon atoms, inclusive. Among such acids are formic, acetic, propionic, butyric, valeric, hexanoic, heptanoic, octanoic, cyclopentancarboxylic, cyclopentylpropionic, benzoic, toluic, oxalic, and the like. Usually a large excess of the acylating agent is used. However, any quantity from about the theoretical amount to about 500 times this amount, or even more, is operative, with an excess of about two to about ten times the theoretical amount being preferred. The acylation may be effected in a solvent, such as tertiary amines, ether, chlorinated hydrocarbons or hydrocarbons. Typical examples of such solvents are chloroform, pyridine, benzene and toluene. A reaction period of about one to twenty hours is satisfactory, with a period of about ten to sixteen hours being preferred.

The acylated crude reaction mixture may be isolated in any convenient manner, for example, if most of the excess acylating agent has been removed during the reaction, the last traces may be removed under vacuum, the residue dissolved in an organic solvent, such as ether, chloroform, and the like, and the resulting solution washed with an aqueous basic solution, such as aqueous sodium bicarbonate, sodium carbonate, sodium hydroxide, and the like, the washed solution dried by a drying agent, such as sodium sulfate, the dried solution filtered to remove the drying agent, the solvent distilled, and the residue crystallized from a suitable solvent, such as benzene. Alternately, if the excess acylating agent has not been removed, the reaction mixture may be stirred with water or a basic solution, such as aqueous sodium bicarbonate solution to decompose the excess acylating agent, then, as described for the first method, the resulting mixture extracted with an organic solvent, the organic solution washed with a basic solution, and the product isolated from the washed organic solution. Typical examples of the diesters which are prepared in this manner are the following derivatives of 9α-fluoro-cortisone and 9α-fluoro-hydrocortisone: 21,21-dipropionate derivatives; 21,21-dibutyrate derivatives; 21,21-divalerate; 21,21-dioctanoate; and 21,21-dibenzoate.

The bisulfite addition products of 9α-fluoro-cortisone-21-aldehyde and 9α-fluoro-hydrocortisone-21-aldehyde are most conveniently prepared by reacting the aldehyde with an aqueous solution of an alkali metal or an alkaline earth metal bisulfite salt. This reaction is preferably effected by reacting a solution of the aldehyde, or the monohydrate salt thereof, in a neutral organic solvent with an aqueous solution of an alkali metal or an alkaline earth metal bisulfite salt. Although various neutral organic solvents including those which are not miscible with water may be used for dissolving the aldehyde, we usually prefer to employ a water miscible solvent, such as a lower alcohol, acetone, dioxane, and the like, for this purpose. The reaction proceeds readily at room temperature and is aided by stirring the mixture. Although the quantities of reactants employed is not critical, and an excess of either reactant may be employed, we usually prefer to use an equivalent amount of each reactant for the obtainment of maximum yields.

The resulting bisulfite addition product can be isolated from the reaction mixture in accordance with conventional procedures. For example, the organic solvent may be removed by distillation and the water evaporated or, the solvent may be removed and the aqueous solution freeze dried. If highly concentrated solutions of the reactants are employed, the bisulfite addition product precipitates from the reaction mixture and may be recovered by direct filtration. If desired, the product may be recrystallized from an organic solvent or a solvent-water mixture. Ethanol has been found satisfactory for this purpose.

The alkaline earth metal bisulfite addition products of 9α-fluoro-cortisone-21-aldehyde and 9α-fluoro-hydrocortisone-21-aldehyde can be prepared either by reacting the aldehyde with the bisulfite salt directly or alternatively, by metathetically reacting an alkali metal bisulfite addition product of the aldehyde with an alkaline earth metal salt in an aqueous medium.

According to an embodiment of the invention, novel compositions for use in the treatment of appropriate diseases are produced, in which the active ingredient is a 9α-fluoro-cortisone-21-aldehyde or 9α-fluoro-hydrocortisone-21-aldehyde or its bisulfite addition product, acetal derivative or 21,21-diester derivative. These compositions comprise at least one of the active compounds intimately united with a suitable carrier which can be either a liquid or a solid. The resulting compositions may be powders, tablets, capsules or other dosage forms, as required. Liquid diluents, such as sterile water or oils, may be used to prepare compositions suitable for parenteral injection. In addition to the active ingredient and water, such compositions may contain suspending agents, such as sodium carboxymethylcellulose, methyl cellulose, gelatin, and various solubilizing or dispersing agents, such as lecithin. Solid preparations suitable for topical and oral administration may be produced by dispersing the active ingredient in a solid carrier, such as starch, sugar or talc and the like. The resulting composition may be used in powder form, or it may be used to fill capsules. In addition, such solid compositions may be produced in tablet form by the application of well-known techniques. The concentration of active ingredients in such compositions, whether liquid or solid, may be adjusted to suit any intended purpose.

The following examples are given for purpose of illustration:

EXAMPLE 1

9α-fluoro-4-pregnene-11β,17α-diol-21-al-3,20-dione

To a solution of 10 mg. of 9α-fluoro-hydrocortisone in 45 ml. of methanol is added a solution of 20 mg. of cupric acetate. The cupric acetate solution contains 0.5 ml. of glacial acetic acid. The resulting mixture is heated to reflux temperature for 30 minutes. At the end of this time 20 ml. of water is added and heating continued for an additional 20 minutes. The cuprous oxide is then removed by filtration, 20 ml. of water added to the filtrate and the filtrate concentrated to a final volume of about 15 ml. The 21-aldehyde of the 9α-fluoro-hydrocortisone is crystallized as the monohydrate on cooling. The crystalline product is washed with ether and dried. The crystalline material exhibits an aldehyde test with Fuchsin aldehyde reagent. The corresponding sodium bisulfite addition product is prepared by reacting the aldehyde in methanol with an equivalent amount of sodium bisulfite.

$$\lambda_{max.}^{alc.} = 238$$

EXAMPLE 2

9α-fluoro-4-pregnene-17α-ol-21-al-3,11,20-trione

By using similar quantities of reactants as in Example 1 and replacing the 9α-fluoro-hydrocortisone with 9α-fluoro-cortisone, the product obtained on concentration is the 21-aldehyde of 9α-fluoro-cortisone. It is isolated as a monohydrate. The corresponding sodium bisulfite addition product is prepared by reacting the aldehyde in methanol with an equivalent amount of sodium bisulfite.

$$\lambda_{max.}^{alc.} = 234$$

EXAMPLE 3

9α-fluoro-4-pregnene-11β,17α-diol-21-al-3,20-dione

The free alcohol of 9α-fluoro-hydrocortisone is also converted to the corresponding 21-aldehyde by oxidation with air in the presence of a small amount of copper acetate catalyst. This is readily accomplished in an aqueous methanol reaction medium containing a trace of glacial acetic acid. Thus, 0.003 mole of the steroid is dissolved in 60 ml. of methanol. 0.0001 mole of copper acetate in 1 ml. of water containing a few drops of glacial acetic acid is added to the steroid solution. Air is bubbled through the reaction mixture at a temperature of about 50° C. for 12 hours. At the end of this time any solid catalyst is removed by filtration, water added to the reaction mixture and the material isolated as in Example 1.

EXAMPLE 4

9α - fluoro - 21,21 - dimethoxy - 4 - pregnene - 11β,17α - diol-3,20-dione

The product of Example 1 is dissolved in 60 ml. of anhydrous methanol containing a small quantity of hydrogen chloride and allowed to stand for one hour at room temperature. At the end of this period 500 ml. of ether was added and then an excess of saturated sodium bicarbonate solution. The ether layer was separated, washed with sodium carbonate solution, water, dried over sodium sulfate and vacuum evaporated to a syrup which solidifies on scratching. The product is the 21,21-dimethoxy derivative (acetal) of 9α-fluoro-hydrocortisone-21-aldehyde.

EXAMPLE 5

9α-fluoro-21,21-diethoxy-4-pregnene-11β,17α-diol-3,20-dione

The diethyl acetal is prepared as the dimethyl acetal in Example 4 by using anhydrous ethanol.

EXAMPLE 6

9α-fluoro-4-pregnene-11β,17α,21,21-tetraol-3,20-dione-21,21-diacetate

A two gram sample of 9α-fluoro-4-pregnene-11β,17α,-

21,21-tetraol-3,20-dione is dissolved in 15 ml. of acetic anhydride and 1 ml. of pyridine, and allowed to stand for two days. Twenty ml. of 50% acetic acid is added to the resulting reaction mixture. The solution is evaporated under diminished pressure to a syrup. The syrup is triturated with 40 ml. of water until the gum solidified. On filtering the mixture crude 21,21-diacetate of 9α-fluorohydrocortisone is obtained. The crude product is purified by dissolving in 30 ml. of amyl acetate, treating with activated charcoal and filtering. Concentration of the filtrate to about 7 ml. and cooling precipitates the pure product.

Any departure from the above description which conforms to the present invention is intended to be included within the scope of the claims.

What is claimed is:

1. 9α-fluoro-4-pregnene-17α-ol-21-al-3,11,20-trione.
2. 9α-fluoro-4-pregnene-11β,17α-diol-21-al-3,20-dione.
3. 9α-fluoro-4-pregnene-17α,21,21-triol-3,11,20-trione.
4. 9α-fluoro - 4-pregnene-11β,17α,21,21-tetraol-3,20-dione.
5. 9α-fluoro-21,21-di(lower alkoxy)-4-pregnene-17α-ol-3,11,20-trione.
6. 9α-fluoro-21,21-di(lower alkoxy) - 4 - pregnene-11β,17α-diol-3,20-dione.
7. 9α - fluoro - 4 - pregnene - 17α,21,21 - triol - 3,11,20-trione 21,21-diacylate, wherein said acyl radicals are derived from organic carboxylic acids having not more than 8 carbon atoms.
8. 9α - fluoro - 4 - pregnene - 11β,17α,21,21 - tetraol-3,20-dione 21,21-diacylate, wherein said acyl radicals are derived from organic carboxylic acids having not more than 8 carbon atoms.
9. Sodium bisulfite addition product of 9α-fluoro-4-pregnene-17α-ol-21-al-3,11,20-trione.
10. Sodium bisulfite addition product of 9α-fluoro-4-pregnene-11β,17α-diol-21-al-3,20-dione.
11. 9α - fluoro - 21,21 - dimethoxy - 4 - pregnene-11β,17α-diol-3,20-dione.
12. 9α - fluoro - 21,21 - diethoxy - 4 - pregnene-11β,17α-diol-3,20-dione.
13. 9α - fluoro - 4 - pregnene - 11β,17α,21,21-tetraol-3,20-dione 21,21-diacetate.
14. The compound selected from the group consisting of compounds having the structural formula:

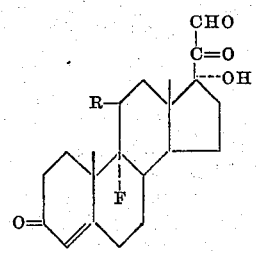

and compounds having the structural formula:

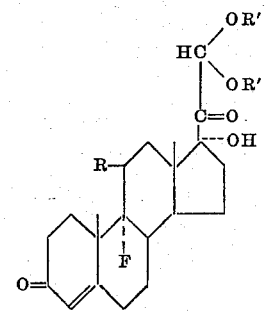

and compounds having the structural formula:

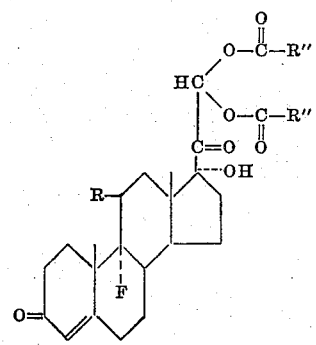

wherein R is selected from the group consisting of a keto-group and a hydroxy-group, R' is selected from the group consisting of hydrogen and alkyl and aralkyl groups containing not more than eight carbon atoms, and R" is selected from the group consisting of hydrogen and alkyl and aryl groups containing not more than eight carbon atoms; and alkali metal and alkaline earth metal bisulfite addition products thereof.

15. Metal bisulphide addition products of 9α-fluoro-4-pregnene-17α-ol-21-al-3,11,20-trione, wherein said metal is selected from the group consisting of alkali metals and alkaline earth metals.

16. Metal bisulfite addition products of 9α-fluoro-4-pregnene - 11β,17α - diol - 21 - al - 3,20 - dione, wherein said metal is selected from the group consisting of alkali metals and alkaline earth metals.

References Cited in the file of this patent

UNITED STATES PATENTS

| | | |
|---|---|---|
| 2,773,077 | Conbere | Dec. 4, 1956 |
| 2,773,078 | Weijlard | Dec. 4, 1956 |
| 2,846,456 | Sarett | Aug. 5, 1958 |

OTHER REFERENCES

Rogers: J. Am. Chem. Soc. 74, 2497 (1952).
Fried: J. Am. Chem. Soc. 75, 2273 (1953).
Fried: J. Am. Chem. Soc. 76, 1455–6 (1954).